INVENTORS
TIMOTHY F. COLLINS
WELDON L. BRUBAKER

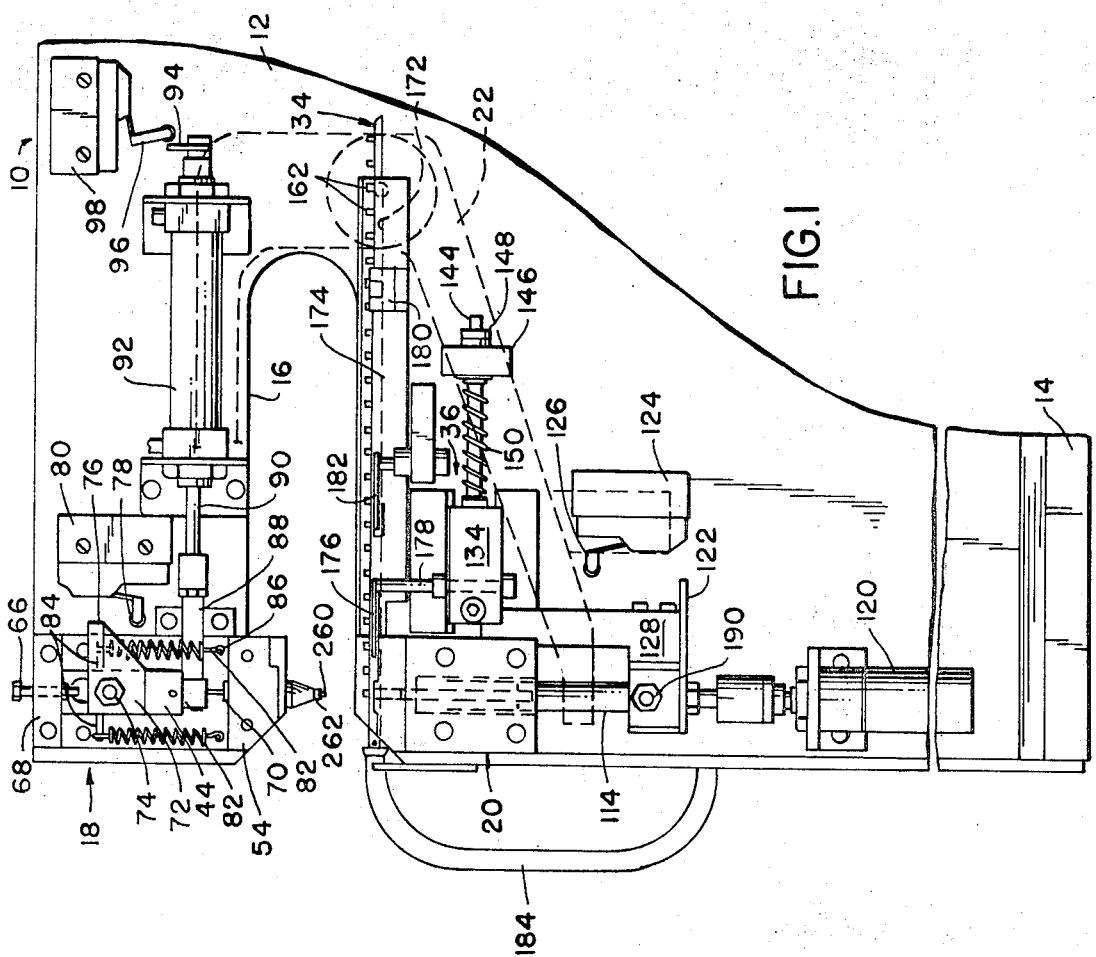
Nov. 10, 1970     T. F. COLLINS ETAL     3,538,581
TERMINAL APPLICATOR
Filed May 27, 1968     5 Sheets-Sheet 1
INVENTORS
TIMOTHY F. COLLINS
WELDON L. BRUBAKER
BY Whittemore, Hulbert & Belknap
ATTORNEYS

ATTORNEYS

INVENTORS
TIMOTHY F. COLLINS
WELDON L. BRUKAKER

BY Whittemore, Hulbert
& Belknap
ATTORNEYS

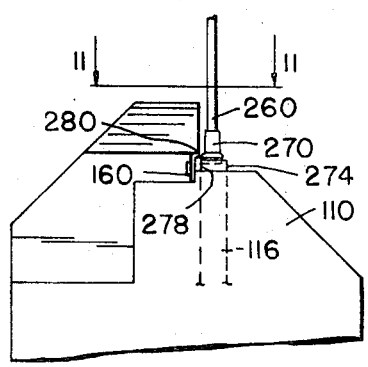
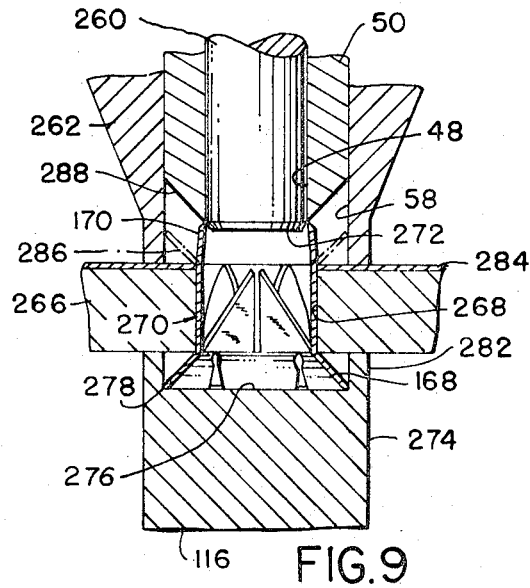
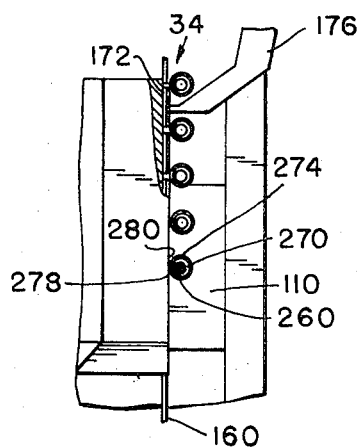
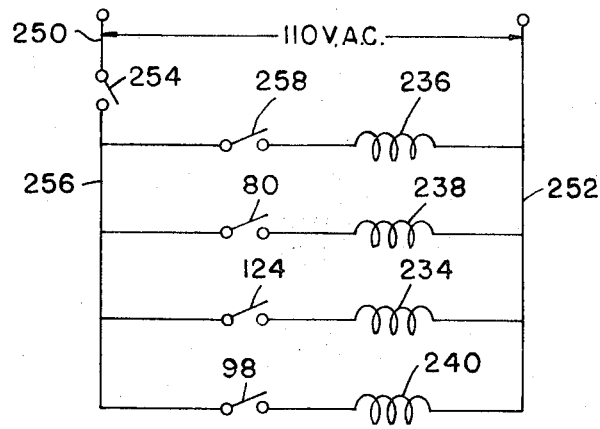
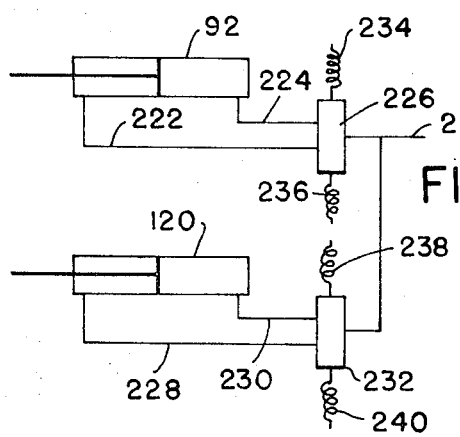

Nov. 10, 1970  T. F. COLLINS ETAL  3,538,581
TERMINAL APPLICATOR
Filed May 27, 1968  5 Sheets-Sheet 5
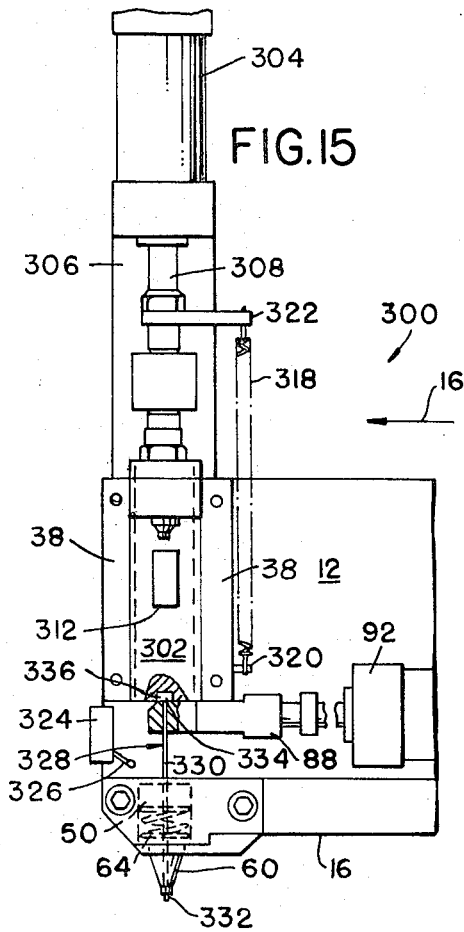
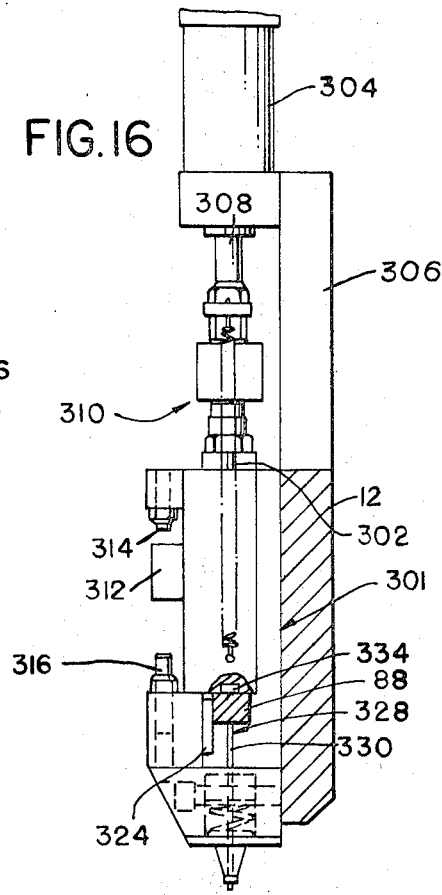
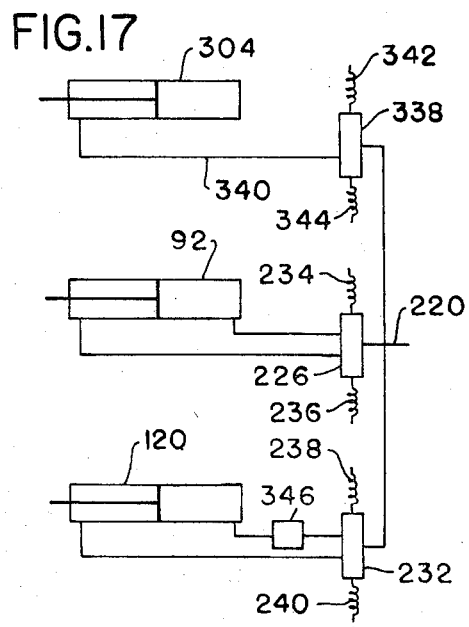
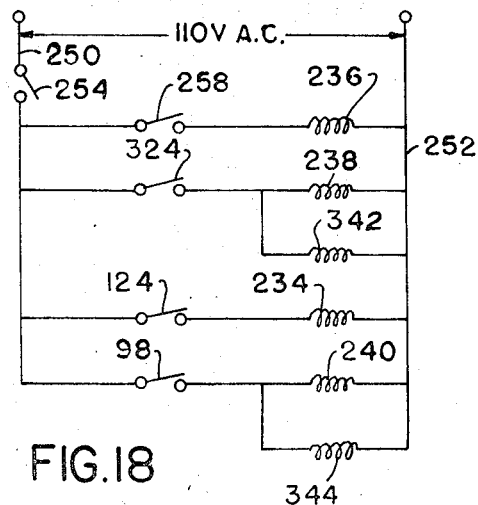
INVENTORS
TIMOTHY F. COLLINS
WELDON L. BRUBAKER
BY Whittemore, Hulbert
& Belknap
ATTORNEYS

United States Patent Office 3,538,581
Patented Nov. 10, 1970

3,538,581
TERMINAL APPLICATOR
Timothy F. Collins, York, and Weldon L. Brubaker, Mechanicsburg, Pa., assignors to Berg Electronics, Inc., New Cumberland, Pa., a corporation of Pennsylvania
Filed May 27, 1968, Ser. No. 732,412
Int. Cl. H05k 13/00
U.S. Cl. 29—203                                       10 Claims

ABSTRACT OF THE DISCLOSURE

Apparatus for securing a through-board terminal to a circuit board by extending a mandrel through a hole in the circuit board to engage one end of the terminal, moving a ram to engage the other end of the terminal, escorting the terminal while held between the ram and mandrel to a seated position in the circuit board hole, and then flaring the terminal to secure it to the board. The mandrel and ram are linked together by a control arm to synchronize their movement as the terminal is moved toward the board.

BACKGROUND OF THE INVENTION

The invention relates to terminal applicators for attaching through-board type terminals to printed circuit boards. The invention is useful in attaching small delicate terminals of the type required to form a reliable electrical connection with the printed circuitry on the board. The terminals are conventionally cylindrical in shape and are fitted within circular holes formed through the thickness of the circuit board. The through-board terminals are relatively small, having outside diameters ranging from 0.090 inch down to 0.030 inch and include flanges and cut-out portions so that they are easily bent out of shape during attachment to the circuit board.

Because of the cylindrical shape of the through-board terminals and their small size and delicate construction, conventional terminal applicators are not suitable for use in securing the terminals to the circuit board. Manual attachment of the terminals to the circuit board is expensive, time-consuming, and unreliable. The terminal applicator described herein automatically attaches cylindrical through-board terminals to a circuit board without deforming the terminal. The operation of the applicator is rapid and reliable so as to materially increase the number of terminals which may be secured to a circuit board in a given time.

In the operation of the applicator terminals are progressively fed to a pick-up position. The operator pilots a circuit board hole around the exposed end of the mandrel which is then extended through the circuit board hole to engage one end of the terminal in the pick-up position. A ram then engages the other end of the terminal and moves the mandrel and terminal toward the circuit board so that the terminal is escorted between the mandrel and ram from the pick-up position to the circuit board and is seated in the circuit board hole without deformation. In one embodiment of the invention a positive link is provided between the ram and mandrel to assure that they move at the same speed and that the terminal is escorted to the circuit board without exposure to stresses likely to deform it. In a second embodiment of the invention a low mass mandrel is provided which is retracted directly in response to movement of the terminal by the ram. The mass of the mandrel is not sufficient to subject the terminal to inertial stresses great enough to deform the terminal. After the terminal has been positively seated in the circuit board hole by the ram, continued extension of the ram flares one end of the terminal so as to secure the same to the circuit board.

DESCRIPTION OF THE DRAWINGS

FIG. 1 is a view showing one side of a terminal applicator according to the invention;
FIG. 2 is a partially broken away front view of the terminal applicator;
FIG. 9 is an enlarged sectional view showing the staking of a terminal to the circuit board;
FIG. 10 is a view of a portion of FIG. 2, showing the terminal prior to severing from the terminal strip;
FIG. 11 is a view taken along line 11—11 of FIG. 10;
FIGS. 12 and 13 are electrical nad pneumatic schematics, respectively, showing the circuitry utilized in the terminal applicator;
FIG. 15 is a partially broken away side view of the mandrel assembly of a modification of the invention;
FIG. 16 is a view of the mandrel assembly of FIG. 15, taken in the direction of arrow 16;
and
FIGS. 17 and 18 are pneumatic and electrical schematics, showing the circuitry used in the improvement of FIGS. 15 and 16.

DESCRIPTION OF THE PREFERRED EMBODIMENTS

Figure 4:
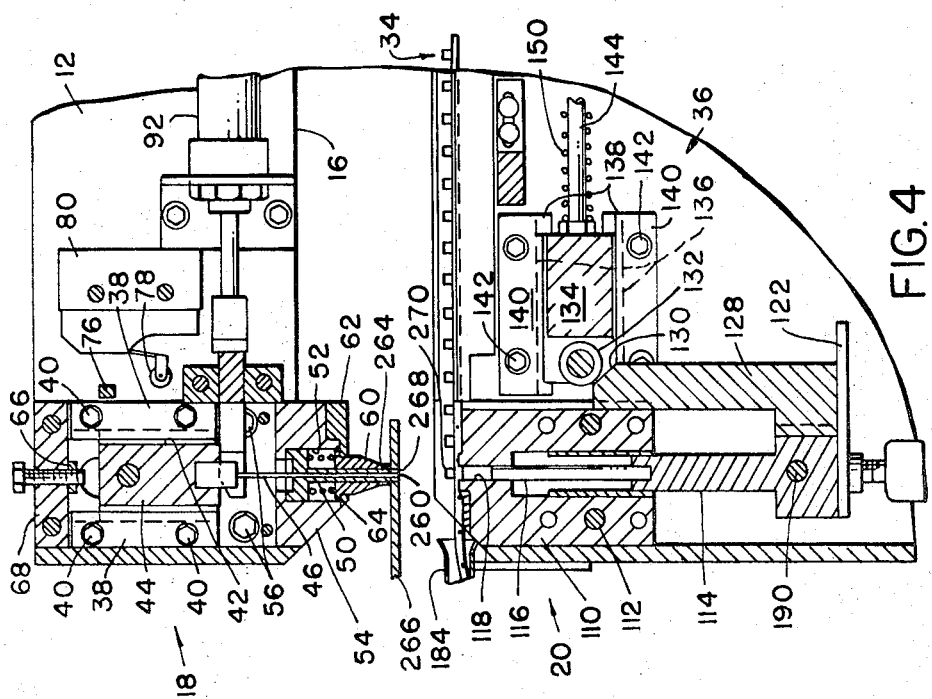
FIG. 4 is a view taken along line 4—4 of FIG. 2.

Terminal applicator 10 includes a vertically extending base plate 12 mounted on suitable base 14. An elongate slot 16 is formed at one edge of plate 12 to define a circuit board receiving opening in the plate. Mandrel assembly 18 is located on one side of plate 12 above the open end of slot 16. Ram assembly 20 is mounted on the same side of plate 12 adjacent slot 16 immediately beneath the mandrel assembly so that the mandrel and ram are in axial alignment. C-shaped control arm 22 is pivotally mounted to the other side of plate 12 at 24 and includes arm portions 26 and 28 which are engageable with portions of the ram and mandrel assemblies 20 and 18 respectively which extend through vertical slots 30 and 32 in plate 12.

Terminal strip 34 is fed along the bottom of slot 16 by a terminal feed 36 to position a lead terminal over the ram assembly and in axial alignment with the ram and mandrel. The terminal feed 36 operates to index the lead terminal during the down or return stroke of the ram.

In the mandrel assembly 18 vertically oriented mandrel guides 38 are mounted on plate 12 by bolts 40 and extend into grooves 42 of mandrel slide 44 to permit vertical movement of the slide. Mandrel 46 is secured to the lower face of slide 44 and extends downwardly through the interior bore 48 of anvil 50. As shown in FIG. 4, anvil 50 is confined against the upper end wall of bore 52 in mandrel block 54 which is secured to plate 12 by bolts 56. Anvil 50 extends through the bore 58 of cylindrical board clamp 60. The diameter of bore 58 is somewhat greater than the diameter of the circuit board hole in which the through-board terminal will be positioned. Circuit board clamp 60 is confined in bore 52 by cap 62 and is biased away from the upper end of anvil 50 by spring 64.

Upward movement of slide 44 is limited by adjustable stop 66 mounted in block 68. Downward movement of the slide is limited by adjustable stop 70 in block 54, best illustrated in FIGS. 1 and 2. Cam plate 72 is mounted on slide 44 by bolt 74 and includes a cam arm 76 engageable with trigger 78 of normally open microswitch 80 so that when the slide 44 is moved down, the switch 80 is momentarily closed.

Slide 44 is biased toward stop 70 by springs 82 which are mounted between pins 84 on the slide and pins 86 on the mandrel block 54. Mandrel latch 88 is mounted on the end of the piston rod 90 of double acting air cylinder 92. Cam 94 is secured to the other end of rod 90 and is operable to engage trigger 96 of normally open microswitch 98 so as to trip the same when the latch 88 is moved toward the mandrel assembly. When the applicator is in the rest position of FIG. 1, latch 88 holds slide 44 away from stop 70.

Ram assembly 20 includes a ram guide 110 mounted to plate 12 by bolts 112. Ram 114 is slidably confined in guide 110 and includes a rod 116 which is extendable through bore 118 to project into the slot 16. Rod 116 is mounted on the same axis as mandrel 46. The piston rod of double-acting air cylinder 120 is secured to the bottom of ram 114. Cam 122 is mounted on ram 114 and extends laterally therefrom toward normally open microswitch 124 so as to contact switch trigger 126 and turn the switch on when the ram 114 is fully extended. Feed cam 128 is also mounted on ram 114 and is provided with a cam surface 130 which is engageable with roller 132 of feed slide 134. Slide 134 is provided with side flanges 136 which are fitted in guide grooves 138 of mounting blocks 140. Bolts 142 secure blocks 140 to plate 12. Rod 144 extends from slide 134 through a bore in block 146 and is provided with a stop 148 at the outer end thereof for limiting return movement of the slide toward the feed cam 128. Spring 150 is wound around rod 144 and biases the slide 134 toward the cam 28 so that the slide is returned to the position shown in FIGS. 1 and 4 upon retraction of ram 114.

Figure 14:
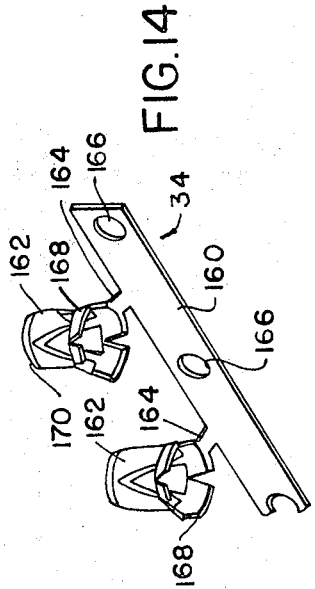
FIG. 14 is a perspective view of a portion of a terminal strip as used in the applicator.

FIG. 14 shows a portion of the terminal strip 34 used by terminal applicator 10. Strip 34 includes a flat flexible carrier strip 160 having through-board terminals 162 secured thereto at regular intervals. Each terminal 162 is provided with a cylindrical body which is offset to one side of the strip 160 as illustrated. The terminals are secured to the strip by a thin metal portion 164 which extends away from one edge of the strip. Pilot holes 166 are punched in strip 160 at regular intervals between adjacent terminals to facilitate feeding of the strip. Terminals 162 are provided with flanges 168 at the ends thereof secured to strip 160 and are tapered inwardly somewhat at free end 170.

Figure 6:
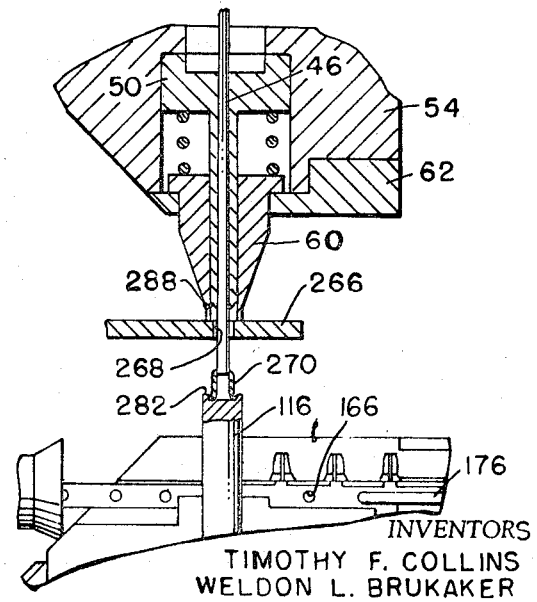

Terminal strip 34 is fed along strip groove 172 toward the mandrel assembly 20 by feed finger 176 which, as shown in FIGS. 6 and 11, engages the pilot holes 166 of strip 160. Finger 176 is secured on the end of shaft 178 which is rotatably carried by slide 134. Finger 176 is biased toward strip 160 by a spring (not shown) to engage the pilot holes 166. When the ram 114 is retracted and slide 134 is moved back to the position shown in FIGS. 1 and 4, finger 176 indexes the lead terminal on strip 34 into axial alignment with rod 116 and mandrel 46.

The terminal feed 36 also includes a conventional terminal strip drag 180 and a one-way latch finger 182. After the terminals 162 are removed from strip 160 and secured to a circuit board, the strip 160 is fed through guide tube 184 away from the mandrel and ram assemblies.

Figure 3:
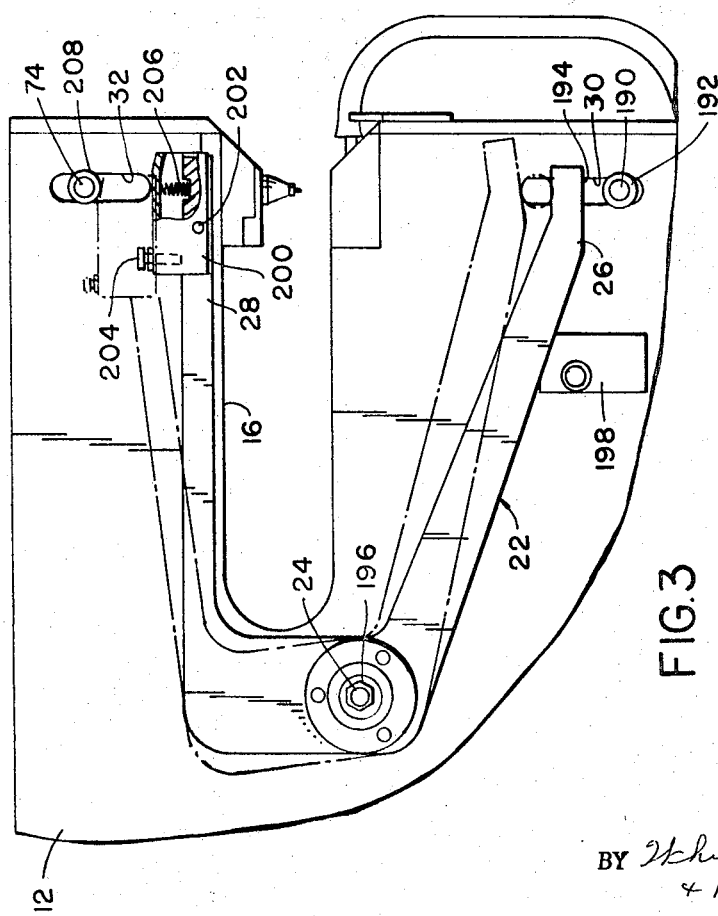
FIG. 3 is a view of the other side of the applicator.

Bolt 190 is attached to ram 114 and extends through slot 30 in plate 12 to the arm side of the plate. Roller 192 is secured on the free end of bolt 190 and is adaptable for engagement with cam surface 194 of arm portion 26 when the ram 114 is raised or extended. Arm 22 is freely journaled on bolt 196 at pivot 24 and when out of engagement with roller 192 rests on stop 198. U-shaped member 200 is pivotally mounted on the free end of arm portion 28 by pin 202 and is provided with an adjustable stop 204 to limit counterclockwise rotation thereof about pin 202 as viewed in FIG. 3. Spring 206 is confined between the end of arm portion 28 and the top of link member 200 outwardly of pin 202 so as to bias the stop into engagement with the arm. The upper surface of member 200 is engageable with roller 208 on the free end of bolt 74. Bolt 74 extends through slot 32 and is mounted on mandrel slide 44 as illustrated in FIG. 2.

Arm 22 forms a link connection between the ram and the mandrel. Member 200, pin 202, stop 204, and spring 206 form a lost motion connection between arm 22 and the mandrel. The lost motion connection is collapsed during staking of the terminal to the circuit board.

The pneumatic circuit for air cylinders 92 and 120 is shown in FIG. 13. Cylinder 92 is connected to pressure fluid source 220 through lines 222 and 224 and double-acting solenoid controlled valve 226. Cylinder 120 is connected to pressure fluid source 220 through pressure lines 228 and 230 and double-acting solenoid controlled valve 232. Valve 226 includes two solenoids 234 and 236 which are used to shift the valve between its two position. In one position pressure fluid is supplied to cylinder 92 through pressure line 222, pressure line 224 is vented, and cylinder 92 is retracted. In the other position pressure fluid is supplied to cylinder 92 through line 224 and line 222 is vented to extend cylinder 92. Likewise control valve 232 is provided with solenoids 238 and 240 which determine the end of cylinder 120 which is supplied with pressure fluid and which end of the cylinder is vented.

FIG. 12 shows an electrical schematic of the circuitry of the terminal applicator 10. Leads 250 and 252 are connected to a voltage source, conventionally 110 volts A.C. The applicator is turned on by closing on-off switch 254 so that voltage drop is provided between leads 252 and 256. Solenoid 236 and normally open foot switch 258 are connected in series between leads 252 and 256. Microswitch 80 and solenoid 238, microswitch 124 and solenoid 234, and microswitch 98 and solenoid 240 are all connected in series between leads 252 and 256.

The operation of the terminal applicator 10 will now be described. When in the rest position illustrated in FIGS. 1-4, the lower end 260 of mandrel 46 extends out of end 262 of circuit board clamp 60 to form a pilot for positioning of a circuit board. The lower end 264 of anvil 50 is located slightly above the bottom of the clamp 60 so that a circuit board can be seated against end 262 with mandrel end 260 extending into a circuit board hole. When it is desirable to secure one of the eyelets 162 to a circuit board 266, the operator uses the lower end 260 of the mandrel as a pilot to position the board, as shown in FIG. 4, with mandrel end 260 extending through circuit board hole 268 and the upper surface of the circuit board held against clamp end 262.

When the operator has positioned the board 262 as in FIG. 4 and has turned on the applicator 10 by closing switch 254, foot switch 258 is tripped to actuate solenoid 236 momentarily, thereby shifting valve 226 to supply pressure fluid through pressure line 222 to the left side of air cylinder 92 and to vent the right side of cylinder 92 through lead 224, thereby retracting the cylinder rod and moving latch 88 from beneath mandrel slide 44. Trigger 96 of switch 98 is provided with a hinged joint (not illustrated) which permits movement of the trigger to the right without closing switch 98. As the piston of cylinder 92 moves to the right, cam 94 engages trigger 96 and moves it to the right without closing the normally open switch.

Figure 5:
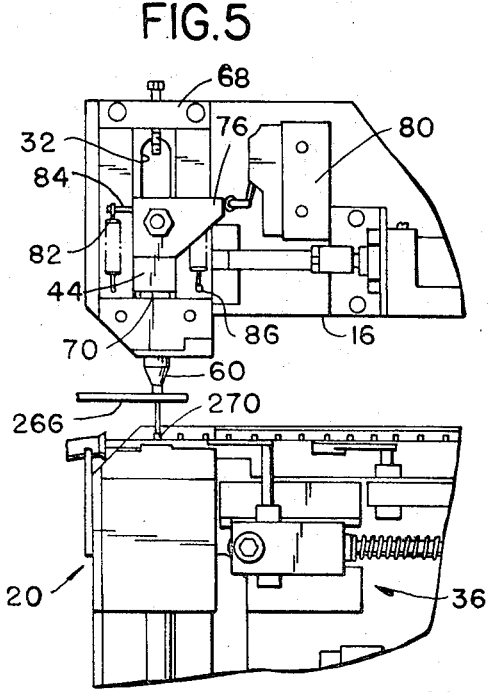
FIGS. 5–8 are side views illustrating the operation of the terminal applicator.
Figure 7:
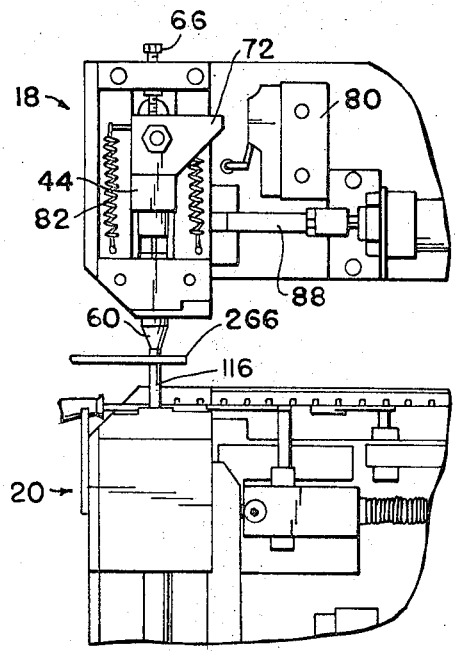

With latch 88 withdrawn, mandrel slide 44 is moved downwardly by springs 82 until the lower surface thereof engages adjustable stop 70 as shown in FIG. 5. Downward movement of the mandrel slide moves mandrel 46 through circuit board hole 268 and brings the lower end 260 thereof into engagement with the upper end 170 of lead terminal 270 on strip 34 as shown in FIG. 10. As illustrated in FIG. 9, mandrel end 260 is chamfered at 272 and extends slightly into the interior of the body of the terminal. Stop 70 is adjusted so that mandrel end 260 engages lead terminal 270 without deforming the terminal.

Lead terminal 270 is positioned immediately above end 274 of rod 116. As mandrel slide 44 is lowered to the position of FIG. 5, cam 76 mounted thereon engages trigger 78 of switch 80 to momentarily close the same and send a power pulse through solenoid 238 of control valve 232. This pulse shifts the valve 232 to pressurize the lower end of air cylinder 120 and to vent the upper end of the air cylinder, whereby the cylinder is extended to extend ram 114 toward the mandrel assembly. As rod 116 is moved up with the ram, a recessed seat 276 formed in end 274 engages the flared end 168 of lead terminal 270. Continued upward movement of the rod 116 frees terminal 270 from strip 160 as connecting portion 164 is severed between cutting edge 278 on the flattened side of the rod 116 and ram assembly cutting edge 280.

Upward movement of ram 114 brings roller 192 into engagement with cam surface 194 of arm 22 and pivots the arm about bolt 196 to bring the cam surface of link 200 into engagement with roller 208 when lead terminal 270 engages seat 276. As the ram continues to move upwardly to sever the terminal 270 from strip 160, roller 208 and mandrel slide 44 are also moved upwardly at the same rate by arm 22 which forms a link between the mandrel and ram. Thus by means of arm 22 movement of the terminal toward the circuit board 266 is achieved with both the rod 116 and mandrel 46 moving at the same rate and with the terminal confined between ends 260 and 274 thereof. In this way the terminal 270 is positively escorted to the circuit board 266 and is not subjected to axial or radial stresses which would be likely to distort or collapse the terminal. Because throughboard terminals like terminal 270 are preferably formed from thin sheet metal stock and may have a diameter as small as 0.030 inch, they are delicate and are easily deformed. This is particularly true in the case of the terminals 162 where wire grip fingers are formed in the body portions, thereby weakening the terminal. The positive escorting of these terminals 270 from the pick-up position adjacent ram assembly 20 to the circuit board 266 by the controlled movement of the ram and mandrel is automatic and reduces the likelihood of terminal deformation. FIG. 6 shows a terminal as it is being escorted toward circuit board 266.

Movement of the mandrel 46 and rod 116 away from the ram assembly 20 carries the terminal toward the circuit board so that when the ram is extended the body of the terminal is positioned in circuit board hole 268 as shown in FIG. 9 and the upper lip 282 of rod 116 abuts the bottom of the circuit board 266 so that the board is sandwiched between the rod and the lower end 262 of clamp 60. Lip 282 extends above seat 270 a distance equal to the axial extent of flange 168 to assure that the flange is seated against the lower edge of circuit board hole 268. During upward movement of the ram and mandrel the operator holds the circuit board against the clamp 60 to permit clamping between the rod and circuit board clamp when the terminal 270 is seated in hole 268. The circuit board 266 is shown having printed circuitry 284 on the upper side thereof. However, the invention is useful for attaching circuit board terminals in holes in circuit boards or substrates regardless of any printed circuitry which may be on the board or substrate.

Figure 8:
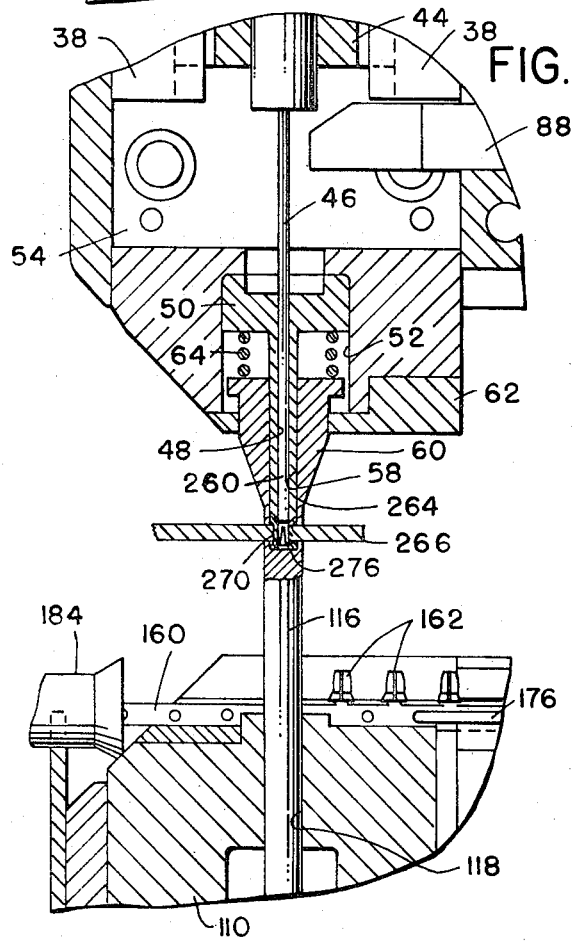

Upward movement of the mandrel to the position shown in FIG. 9 carries slide 44 past mandrel latch 88 and brings it into engagement with stop 66 when the terminal is seated in hole 268 to prevent further movement of the mandrel. Continued upward movement of ram 114 and rod 116 moves the circuit board 266 and clamp 60 up against spring 64 so that the free end 170 of the terminal 270 is flared outwardly to form an annular flange 286 by the conical lower surface 288 of fixed anvil 50 as illustrated in FIG. 8. Formation of flange 286 secures terminal 270 to the circuit board. During flaring or staking of the terminal to the circuit board the force required to collapse spring 64 and move clamp 60 up with rod 116 is transmitted through lip 282 and circuit board 266 to the lower end 262 of the clamp, thereby avoiding stressing of the terminal. The terminal is sufficiently strong to withstand the forces exerted thereon during flaring by the anvil 50. During flaring or staking the mandrel 46 and anvil 50 are held against movement, thus assuring that upward movement of the board and terminal results in staking of the terminal. The chamfer 272 on mandrel 46 extends slightly into the interior of terminal 270 to prevent collapsing of the free end 170 during staking.

Upward movement of the ram during staking of the terminal raises roller 192 and rotates arm 22 about pivot 24. Since mandrel slide 44 abuts stop 66, the movement of the arm 22 during staking collapses link 200 about pivot 202 slightly against the action of spring 206 so as to form a lost motion connection and permit the staking movement of the ram while the mandrel slide is fixed. Spring 206 is sufficiently strong to prevent collapsing of the lost motion connection during severing of the terminal from the carrier strip and escorting of the terminal to the seated position in the circuit board shown in FIG. 9. Adjustable stop 204 in link 200 is used to adjust the distance between the rod 116 and mandrel 46 to assure proper escorting and seating of the lead terminal.

When the ram 114 is fully extended, cam 122 carried thereby engages trigger 126 of microswitch 124 to momentarily turn the switch on and send a power pulse through solenoid 234 of control valve 226, thereby providing pressure fluid through line 224 to the right-hand end of cylinder 92 and venting the left-hand end of cylinder 92 through the line 222 to extend the cylinder and move mandrel latch 88 below slide 44. When the cylinder 92 is extended and latch 88 is positioned as in FIG. 1, cam 94 engages trigger 96 of switch 98 to momentarily trip the same and provide a power pulse through solenoid 240. This pulse actuates valve 232 to retract cylinder 120 and move ram 114 back to the position of FIG. 4. When the ram is retracted the circuit board is freed and the operator may position another circuit board hole on the lower end 260 of the mandrel and repeat the cycle.

During upward movement of the ram 114, cam 130 engages roller 132 to move feed slide 134 away from the ram assembly and compress return spring 150. This movement of the slide 134 moves feed finger 176 upstream relative to the carrier strip and into engagement with or slightly past the next upstream pilot hole 166 in the terminal carrier strip.

When the ram is retracted slide 134 is moved back to the position of FIG. 4 by spring 150 and the feed finger engages the next upstream pilot hole and indexes a new lead terminal into axial alignment with the mandrel and ram. During retraction of the ram, arm 22 is held in contact with roller 192 by gravity and springs 82 until downward movement thereof brings arm portion 25 into engagement with rest 198.

Control arm 22 of applicator 10 is illustrative of one of a number of ways to provide a link between the ram and mandrel so as to synchronize the extension of the ram with the retraction of the mandrel during escorting of the terminal from the pick-up position to the seated position in the circuit board hole. It is obvious that the pivoted control arm 22 could be replaced by a sliding control arm free to move along an axis parallel to the axis of the ram and mandrel or by a hydraulic link between the ram and mandrel. Other equivalent links between the ram and mandrel which directly tie the movement of the mandrel to movement of the ram could be provided and it is intended that the invention not be limited to a pivoted control arm type link as described herein.

To assure proper staking of the terminal to the circuit board in applicator 10 it is necessary to provide a lost motion connection in the link joining the mandrel and ram. Location of the lost motion connection adjacent the mandrel isolates it from inertial forces generated by the mass of the link between it and the ram and reduces the possibility of premature collapse of the lost motion connection. As an alternative to the spring biased lost motion connection disclosed in applicator 10, a positive latch-type connection could be provided to eliminate the possibility of premature collapse of the connection. When the ram engages the circuit board and seats the terminal in the circuit board hole, the latch connection would be freed for collapse to permit attachment of the terminal to the circuit board. Other lost motion connections could be used.

In a second embodiment of the invention illustrated in FIGS. 15–18, the control arm link between the ram and mandrel is eliminated and a low mass mandrel is provided. After the low mass mandrel is extended through the circuit board hole and the free end engages the lead terminal, extension of the ram moves both the terminal and the mandrel toward the mandrel assembly with the motion of the ram being transmitted to the mandrel through the terminal. The mass of the mandrel is slight so that the inertia forces exerted on the terminal as it is confined between the ram and the mandrel and escorted to the circuit board are not sufficient to deform the terminal or prevent attachment to the circuit board.

FIGS. 15 and 16 illustrate mandrel assembly 301 of an applicator 300 according to the second embodiment of the invention. In describing the second embodiment where the structure is the same as in the first embodiment, the reference numbers assigned to the first embodiment will be used. The ram assembly and terminal feed of applicator 300 are the same as in applicator 10.

As illustrated in FIGS. 15 and 16, mandrel assembly 301 is mounted on plate 12 to one side of slot 16 in the same location as mandrel assembly 18 in applicator 10. The assembly 301 includes a mandrel slide 302 which is mounted on mandrel guides 38. Air cylinder 304 is secured to plate 12 by bracket 306 above slide 302. Air cylinder piston rod 308 is directly connected to the slide 302 through a joint 310.

Bracket 312 on slide 302 projects away from plate 12 for engagement with adjustable stops 314 and 316 to limit movement of the slide in assembly 301. Spring 318 is mounted between pin 320 on assembly 301 and pin 322 attached to joint 310 so as to bias the slide 302 toward stop 316. Microswitch 324 is mounted on assembly 301 so that trigger 326 is tripped by slide 392 when bracket 312 engages stop 316.

Anvil 50, spring 64, and board clamp 60 of assembly 301 are the same as in the previously described embodiment of the invention. Low mass mandrel 328 includes an elongate thin cylindrical body portion 330 having a chamfered free end 332 which normally projects below the end of board clamp 60, and a flat cylindrical head 334. The bottom face of slide 302 is recessed at 336 to accommodate head 334 when the assembly 301 is positioned as shown in FIG. 15. Mandrel 328 is slidably confined within the interior bore of anivil 50 and, in contrast with mandrel 46 of the first embodiment, is not secured to slide 302. When mandrel latch 88 is extended into the assembly 301 by cylinder 92 as shown in FIG. 15, it engages both slide 302 and head 334 of mandrel 328 to prevent movement of either the slide or the mandrel toward the ram.

FIG. 17 is a schematic of the pneumatic circuit of applicator 300. Air cylinders 92 and 120 are connected to pressure fluid source 220 through solenoid control valves 226 and 232 as in applicator 10, with the exception that a flow control device 346 is provided in one of the leads connecting cylinder 120 to valve 232. Air cylinder 304 is connected to pressure fluid source 220 through double acting solenoid valve 338 and lead 340. The position of valve 338 is controlled by solenoids 342 and 344. FIG. 18 is a schematic showing the electrical circuitry of the applicator 300 and is like FIG. 12 with the exception that switch 324 is substituted for switch 80, solenoid 342 of valve 338 is in series with solenoid 238, and solenoid 344 of valve 338 is in series with solenoid 240.

FIGS. 15 and 16 show the mandrel assembly 301 in the rest position with spring 318 biasing slide 302 and mandrel 328 against latch 88 so that the free end of the mandrel projects out of the assembly to permit the operator to position a circuit board in the slot 16 and move it toward the mandrel assembly 301 so that the mandrel projects through a circuit board hole in the board and the board is held against clamp 60. With the circuit board held against clamp 60 and the mandrel positioned in the circuit board hole in which it is desirable to attach one of the terminals 162, the operator turns applicator 300 on by closing switch 254 and closes foot switch 258 to send a power pulse through solenoid 236 of valve 226.

Actuation of the solenoid 236 shifts the valve 226 and causes air cylinder 92 to retract latch 88 from beneath the slide and the mandrel. With the latch withdrawn, spring 318 moves slide 302 toward the slot 16 and extends the body portion 330 of mandrel 328 until the free end engages the top of the lead terminal 270. Stop 316 is adjusted to prevent any further downward movement of slide 302 or extension of the mandrel after the end of the mandrel engages the lead terminal.

As the mandrel and slide bottom, trigger 326 is tripped momentarily to close normally open microswitch 324 and send a power pulse through solenoid 238 of valve 232 and solenoid 342 of valve 338. Actuation of solenoid 342 shifts valve 338 from a first or rest position in which lead 340 is vented and pressure fluid is not supplied to the air cylinder 304 to a second or work position in which pressure fluid is supplied to the end of cylinder 304 adjacent assembly 301, thus moving slide 302 up to the retracted position where flange 312 engages stop 314. Because the mandrel is free of the mandrel slide, retraction of the slide does not retract the mandrel from the extended position where its free end engages the lead terminal.

Upon momentary closing of switch 324, solenoid 238 is actuated to shift valve 232 thereby extending cylinder 120 and ram 116. As the ram is extended it engages the bottom of the lead terminal 270 and with continued extension severs the terminal from carrier strip 160 and moves the terminal and the freed mandrel 328 toward the circuit board. The mass of the mandrel 328 is slight so that the terminal 270 is not deformed by the stresses it is subject to when the mandrel and terminal are accelerated to move with the ram. Since it is important that the mandrel 328 be free to move with the ram, thereby reducing the stresses applied to the terminal as it is moved into engagement with the circuit board, a fluid flow control device 346 is provided in one of the two pressure leads 228, 230 which connect air cylinder 120 to its control valve 232. Flow control 346 obstructs the flow of pressure fluid through passage 228 or 230 to slow the extension of cylinder 120 and assure that cylinder 304 and slide 302 are retracted before ram 116 is extended. This guarantees that the mandrel 328 does not engage slide 302 as the terminal is moved from the pick-up position to the circuit board.

As the ram 116 is extended, mandrel 328 guides the terminal held between the mandrel and ram into the circuit board hole. When the terminal is seated in the hole the circuit board is sandwiched between clamp 60 and ram lip 282. Continued upward movement of the ram flares the upper end of the terminal to secure the terminal to the circuit board in the same way as in applicator 10. During the final extension of ram 116 which collapses clamp 60 against spring 64, mandrel head 334 engages slide 302 to prevent further retraction of the mandrel and assure proper flaring of the terminal.

Full extension of ram 116 trips switch 124 to send a power pulse through solenoid 234 to shift control valve 226 and provide pressure fluid to extend air cylinder 92 and move latch 88 under both mandrel slide 302 and mandrel head 334. When the air cylinder 92 is fully extended, switch 98 is tripped to provide a power pulse through solenoid 240 of control valve 232 and solenoid 344 of control valve 338. Actuation of solenoid 240 shifts valve 232 and retracts air cylinder 120 to withdraw ram 116 from the extended position back to the rest position below the terminal carrier strip 160. As the ram is retracted a new lead terminal is fed to the pick-up position by terminal feed 36. Actuation of solenoid 344 trips valve 338 to vent lead 340 thereby permitting spring 318 to move slide 302 and mandrel 330 from the fully retracted position wherein flange 312 abuts stop 314 to the rest position as shown in FIG. 15 where both the mandrel and slide engage latch 88 and the cycle of operation of applicator 300 is completed.

In both applicator 10 and applicator 300 the extension of the mandrel into slot 16 to engage the upper end of the lead terminal is accomplished by a spring rather than by an air cylinder. This is an important feature of the invention since it is possible that the operator could trip the foot switch 258 to start the cycle of the applicator when a circuit board is improperly positioned in slot 16 and the free end of the mandrel is not positioned in a hole in the circuit board. With a misaligned circuit board in slot 16, spring extension of the mandrel brings the free end of the mandrel into engagement with the circuit board and pinions the circuit board against the lower edge of the slot 16. The mandrel assembly would be prevented from bottoming by the board and the cycle of operation would stop. The operator could then turn the applicator off, reset the apparatus in the rest position, and continue attaching terminals to the circuit board. If the applicator mandrel were positively extended by an air cylinder it is possible that the mandrel would punch through a misaligned circuit board, requiring that the circuit board be discarded.

What we claim as our invention is:

1. Apparatus for attaching a terminal to a circuit board comprising a support having a circuit board recess formed therein, a mandrel mounted on said support at one side of said recess and extendable along its axis into said recess, a ram mounted on said support at the other side of said recess opposite said mandrel and in axial alignment therewith and extendable into said recess along said axis, feed means for positioning a terminal in a pick-up position on said axis adjacent said ram, motive means for extending said mandrel through a hole in a circuit board positioned in said recess to bring the lead end thereof into engagement with the terminal, first means for synchronizing retraction of said mandrel with extension of said ram, drive means for bringing said ram into engagement with the terminal and then synchronously extending said ram and retracting said mandrel through operation of said first means to escort the terminal from said pick-up position into the hole in the circuit board, and attachment means for securing the terminal to the circuit board.

2. Apparatus as in claim 1 wherein said first means comprises a direct coupling between said ram and mandrel.

3. Apparatus as in claim 2 wherein said coupling includes a C-shaped arm pivotally connected to said support away from said mandrel and having arm portions extending about said recess, one arm portion being operatively connected to said ram and the other arm portion being operatively connected to said mandrel so as to join axial movement thereof during extension of said ram and retraction of said mandrel.

4. Apparatus as in claim 2 wherein said motive means comprises a spring arranged to bias said mandrel toward said ram.

5. Apparatus as in claim 3 wherein said attachment means includes a fixed anvil surrounding said mandrel adjacent said one side of said recess and adapted to engage the terminal when positioned in the circuit board hole, stop means engageable with said mandrel to prevent retraction thereof after the terminal is positioned in the circuit board hole, and collapsible lost motion means in said coupling whereby extension of said ram after the terminal is positioned in the circuit board hole collapses said lost motion means and moves the terminal against the fixed mandrel and anvil to deform the terminal to engage the circuit booard.

6. Apparatus as in claim 5 wherein said lost motion connection is located in said coupling adjacent said mandrel to isolate the same from inertial forces during movement of the terminal toward the circuit board.

7. Apparatus as in claim 1 wherein said motive means includes means engageable with said mandrel to extend the same and retractible from said mandrel following extension thereof prior to extension of said ram to reduce the mass movable with said mandrel during retraction thereof, said mandrel having a low mass insufficient to subject the terminal to deforming inertial forces during escorting of the terminal from the pick-up position to the circuit board, said mandrel being free to be retracted in response to movement of said ram transmitted through the terminal during extension of the ram.

8. A method for mounting a terminal on a circuit board by an apparatus having a mandrel and a ram in spaced axial alignment comprising the steps of positioning a circuit board between the ram and mandrel, piloting a hole in the circuit board relative to the mandrel to position the hole around the end of the mandrel, extending the mandrel through the circuit board hole toward the ram, confining a terminal between the extended mandrel and the ram, extending the ram and retracting the mandrel at the same rate to escort the terminal confined therebetween toward the circuit board and into the circuit board hole, and securing the terminal to the circuit board.

9. A method as in claim 8 including the steps of moving part of the terminal through the circuit board hole and outwardly of the circuit board, seating the ram against the circuit board adjacent the circuit board hole, and further extending the ram to move the circuit board and terminal toward a fixed anvil and flaring said terminal part against the anvil to engage the circuit board.

10. Apparatus for attaching a terminal to a circuit board comprising a support having a circuit board recess formed therein, an extendable mandrel mounted on said support above said recess, an extendable ram mounted on said support below said recess and in axial alignment with said mandrel, a slide movably mounted on said support and engageable with said mandrel during axial extension thereof, resilient means operable on said slide to move the same and extend said mandrel through a hole in a circuit board in said recess so that the lead end of the mandrel engages a terminal positioned above said ram, drive means for axially extending said ram to engage the terminal and retract said mandrel so as to escort the terminal while held between the mandrel and the ram toward the circuit board and into the circuit board hole, and means for deforming the terminal so as to secure the terminal to the circuit board.

References Cited

UNITED STATES PATENTS

| | | | |
|---|---|---|---|
| 2,907,040 | 10/1959 | Woods | 29—203 |
| 3,302,274 | 2/1967 | Stoltz | 29—203 |
| 3,365,781 | 1/1968 | Fegley et al. | 29—203 |

THOMAS H. EAGER, Primary Examiner